(12) United States Patent
Song et al.

(10) Patent No.: US 6,621,390 B2
(45) Date of Patent: Sep. 16, 2003

(54) ELECTROSTATICALLY-ACTUATED CAPACITIVE MEMS (MICRO ELECTRO MECHANICAL SYSTEM) SWITCH

(75) Inventors: Insang Song, Yongin (KR); Jae-geun Oh, Seongnam (KR); Bumkyoo Choi, Koyang (JP); Chongwoo Kim, Yongin (KR); Cimoo Song, Yongin (KR)

(73) Assignee: Samsung Electronics Co., Ltd. (KR)

( * ) Notice: Subject to any disclaimer, the term of this patent is extended or adjusted under 35 U.S.C. 154(b) by 333 days.

(21) Appl. No.: 09/794,096

(22) Filed: Feb. 28, 2001

(65) Prior Publication Data

US 2002/0153236 A1 Oct. 24, 2002

(51) Int. Cl.⁷ ............................................... H01H 51/22
(52) U.S. Cl. ........................ 335/78; 200/181; 361/233
(58) Field of Search .................. 335/78; 361/230–235; 200/181; 333/262

(56) References Cited

U.S. PATENT DOCUMENTS

| 5,880,921 | A | * | 3/1999 | Tham et al. ................. 361/233 |
| 6,144,545 | A | * | 11/2000 | Lee et al. .................... 361/233 |
| 6,229,683 | B1 | * | 5/2001 | Goodwin-Johansson .... 200/181 |

* cited by examiner

*Primary Examiner*—Lincoln Donovan
(74) *Attorney, Agent, or Firm*—Burns, Doane, Swecker & Mathis, L.L.P.

(57) ABSTRACT

An electrostatically actuated capacitive MEMS switch includes a plurality of cantilever springs which are actuated parallel to the plane of a substrate. The springs are connected to posts vertically formed on the substrate, and an insulating layer for preventing direct contact between springs and inducing switching depending on a variation in capacitance between the springs is formed on the surface of each of the springs. An opening is formed in the substrate, and the springs are located over the opening. Each of the springs has both lateral portions located on different planes and a slanted middle portion for connecting the two lateral portions to each other.

32 Claims, 12 Drawing Sheets

ELECTROSTATICALLY-ACTUATED CAPACITIVE MEMS (MICRO ELECTRO MECHANICAL SYSTEM) SWITCH

BACKGROUND OF THE INVENTION

1. Field of the Invention

The present invention relates to electrostatically-actuated capacitive micro electro mechanical system (MEMS) switches, and more particularly, to a horizontally electrostatically actuated capacitive MEMS switch having a low insertion loss, a low pull-in voltage and low power consumption.

2. Description of the Related Art

MEMS switches generally include thermo-electrically actuated switches and electrostatically-actuated switches. The electrostatically-actuated switches are classified into resistive switches and capacitive switches according to a switch operation method.

Researches into individual component parts of a communication system, such as the arrangement of switches, filters, inductors, voltage actuated variable capacitors and antennas that can be connected with low noise amplifiers (LNAs), mixers and oscillators that adopt the MEMS technique, have been conducted.

MEMS switches used for a microwave or a radio frequency (RF) band are very profitable to reduce the size and weight of communications systems, because of their advantages such as a low insertion loss and a nearly-negligible quantity of power consumption compared to existing semiconductor switches. Conventional microwave MEMS switches adopting the infinitesimal processing technique cannot be widely used because of drawbacks such as adhesion-related problems and a high pull-in voltage.

As for these conventional MEMS switches, MEMS switches disclosed in U.S. Pat. Nos. 5,578,976 and 5,880, 921, "Micromechanical Electrostatic K-Band Switches", IEEE MTT-S, 1998, "Micromechnical Membrane Switches for Microwave Applications", IEEE MTT-S, 1995, "Microwave and mm-Wave MEMS Switches", MEMS PI Meeting at Berkeley, Calif., 1997, and "Performance of Low-Loss RF MEMS Capacitive Switches", IEEE Microwave and Guided Wave Letters, Vol. 8, No. 8, 1998 are designed so that electrical signals are switched by a driving method.

Conventional MEMS switches have a structure in which a coplanar waveguide (CPW) is formed on a substrate, and a thin bridge, which is a switching structure, is formed to a predetermined height on the formed CPW.

In the switch shown in FIG. 1, a thin switching structure is supported by a serpentine spring, and on/off switching is achieved by actuation in the direction vertical to the substrate. The switch shown in FIG. 2 has a structure in which a switch structure is supported by a cantilever spring to a predetermined height over the substrate.

This vertically driven MEMS switch has a simple structure, and is easily manufactured. However, in this vertically driven MEMS switch, the weight of a switch structure capable of being supported by a spring is restricted. In particular, upon the manufacture of this MEMS switch, the switching structure sticks to the substrate.

A method of manufacturing a vertically driven MEMS switch is conceptually shown in FIGS. 3A and 3B. Referring to FIGS. 3A and 3B, a switching structure 2 is formed on a sacrificial layer 3 formed on a substrate 1 to a predetermined thickness. Then, the sacrificial layer 3 is removed to fly the switching structure over the substrate 1 to a predetermined height.

The process of removing the sacrificial layer 2 is accompanied by a rinsing process using dionized water. At this time, as shown in FIG. 4A, dionized water 4 that generates a strong capillary attraction between the substrate 1 and the switching structure 2 exists therebetween. After drying, as shown in FIG. 4B, the switching structure 2 sticks to the substrate 1.

The adhesion of the movable switching structure to the substrate is achieved not only by the capillary attraction generated by dionized water but also by various factors such as solid bridging caused by the covalent bond of nonvolatile impurities produced by rinsing and drying, an electrostatic force generated by a remanent charge moved to the surface of a switching element after having been accumulated around a switching structure, and a van der Waals force between molecules existing on the surface of a switching element and a substrate. The adhesion caused by various factors as described above provokes malfunction or degradation of switches, so that it must be absolutely avoided. In order to prevent adhesion of a switching structure, the prior art has tried various methods of increasing the spring constant of a spring structure for supporting a switching structure, of employing rinsing water having a low surface tension, of drying a spring structure using a sublimation method after rinsing the spring structure, of installing a restoration electrode on a spring structure to separate the spring structure from a substrate, and of greatly increasing the gap between a substrate and a spring structure.

SUMMARY OF THE INVENTION

To solve the above problem, an objective of the present invention is to provide an electrostatically and laterally actuated capacitive MEMS switch designed to effectively prevent adhesion of a switching structure.

Another objective of the present invention is to provide an electrostatically and laterally actuated capacitive MEMS switch which requires a low pull-in voltage is and has a low insertion loss.

Still another objective of the present invention is to provide an electrostatically and laterally actuated capacitive MEMS switch designed so that linear switching is accomplished by a spring structure.

To achieve the above objectives, the present invention provides an electrostatically actuated capacitive MEMS switch according to a first aspect, including: a substrate; first and second posts installed a predetermined distance apart on the substrate; a first cantilever spring having a rear portion connected to the first post and a leading portion located at the center of the substrate; and a second cantilever spring having a rear portion connected to the second post and a leading portion spaced a predetermined distance apart from the leading portion of the first spring, wherein an insulating layer is formed on the leading portion of at least one of the first and second springs to form a variable capacitor between the leading portion of the first spring and that of the second spring.

In the switch according to the first aspect of the present invention, preferably, a signal input unit and a signal output portion are installed adjacent to the first and second posts, respectively, to be electrically connected to the first and second posts, respectively, and a signal input capacitor and a signal output capacitor are installed between the signal input unit and the first post and between the signal output unit and the second post, respectively, to block the flow of direct current.

Also, preferably, first and second power supply input units are installed adjacent to the first and second posts, respectively, to be electrically connected to the first and second posts, respectively, and first and second inductors with predetermined inductance for blocking electrical signals with a predetermined frequency and greater are installed between the first post and the first power supply input unit and between the second post and the second power supply input unit, respectively.

To achieve the above objectives, the present invention also provides an electrostatically actuated capacitive MEMS switch according to a second aspect, including: a substrate; a first post installed at one side on the substrate; second and third posts installed a predetermined distance apart at the other side on the substrate; a first cantilever spring having a rear portion connected to the first post and a leading portion extending toward the center of the substrate; a second cantilever spring having a rear portion connected to the second post and a leading portion spaced a predetermined distance apart from one side of the leading portion of the first spring; and a third cantilever spring having a rear portion connected to the third post and a leading portion spaced a predetermined distance apart from the other side of the leading portion of the first spring, wherein an insulating layer is formed on at least one side of both sides of the leading portion of the first spring, the inner side of the second spring facing on side of the leading portion of the first spring, and the inner side of the third spring facing on the other side of the leading portion of the first spring, so that a variable capacitor is formed between the leading portions of adjacent springs.

In the electrostatically actuated capacitive MEMS switch according to the second aspect of the present invention, preferably, a signal input unit is installed adjacent to the first post to be electrically connected to the first post, a signal input capacitor is installed between the signal input unit and the first post to block the flow of direct current, first and second selective signal output units are installed adjacent to the second and third posts to be electrically connected to the second and third posts, respectively, and first and second output capacitors are installed between the second post and the first selective signal output unit and between the third post and the second selective signal output unit, respectively, to block the flow of direct current.

Also, a first power supply input unit is installed adjacent to the first post to be electrically connected to the first post, a first inductor for blocking electrical signals with a predetermined frequency and greater by having predetermined inductance is installed between the first post and the first power supply input unit, second and third selective power supply input units are installed adjacent to the second and third posts, respectively, and second and third inductors for blocking electrical signals with a predetermined frequency and greater by having predetermined inductance are installed between the second post and the first selective power supply input unit and between the third post and the second selective power supply input unit, respectively.

In the electrostatically actuated capacitive MEMS switches according to the first and second aspects of the present invention, preferably, the springs are Z-shaped and stepped, each having both lateral portions located on different planes and a slanted middle portion for connecting the two lateral portions. Also, it is preferable that an opening is formed at the center of the substrate, and the springs are located over the opening.

BRIEF DESCRIPTION OF THE DRAWINGS

The above objective and advantage of the present invention will become more apparent by describing in detail preferred embodiments thereof with reference to the attached drawings in which.

DESCRIPTION OF THE PREFERRED EMBODIMENTS

Electrostatically-actuated capacitive MEMS switches according to the present invention include single pole single throw (SPST) switches and single pole double throw (SPDT) switches. That is, electrostatically-actuated capacitive MEMS switches according to the present invention are designed to simply open and close the transmission path of electrical signals or selectively change the transmission path of electrical signals. In these electrostatically-actuated capacitive MEMS switches according to the present invention, mechanical actuation and electrical on and off operations occur within a switching structure which forms the transmission path of an electrical signal.

Figure 1:
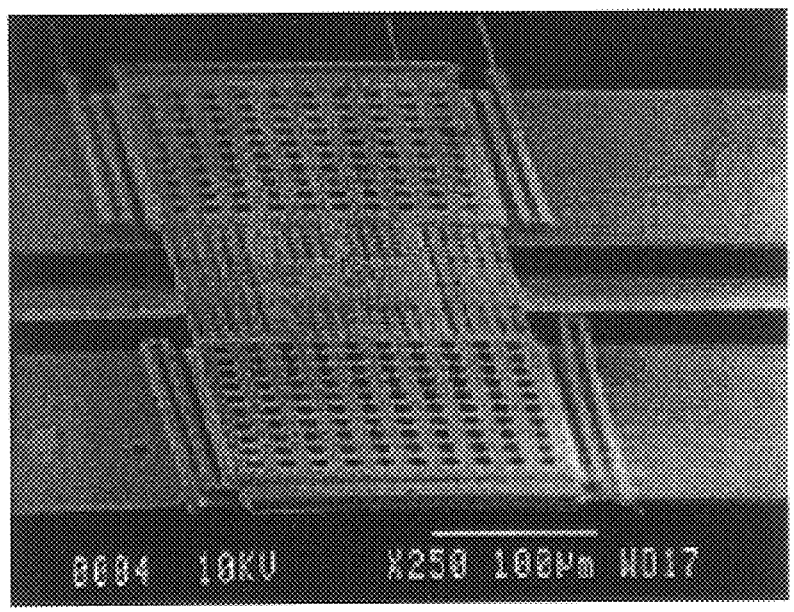
FIG. 1 is an SEM picture of a conventional MEMS switch in which a switching structure is a serpentine spring.
Figure 2:
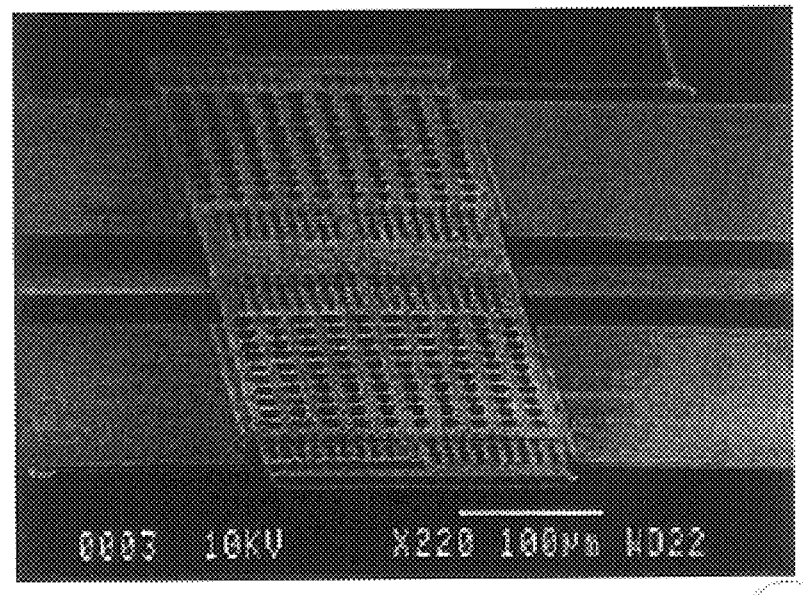
FIG. 2 is an SEM picture of a vertical actuated MEMS switch adopting a cantilever spring.
Figure 3A:
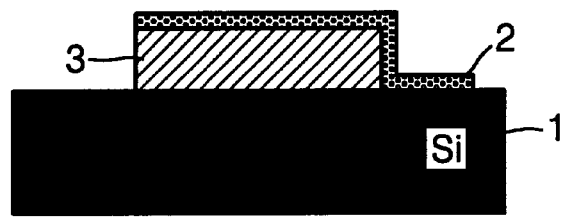
FIGS. 3A and 3B are cross-sectional views illustrating a process for manufacturing a switch structure upon the manufacture of a conventional vertical actuated MEMS switch.
Figure 3B:
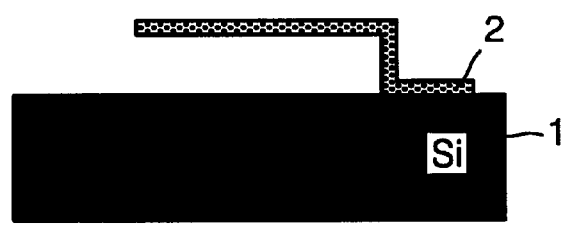
Figure 4A:
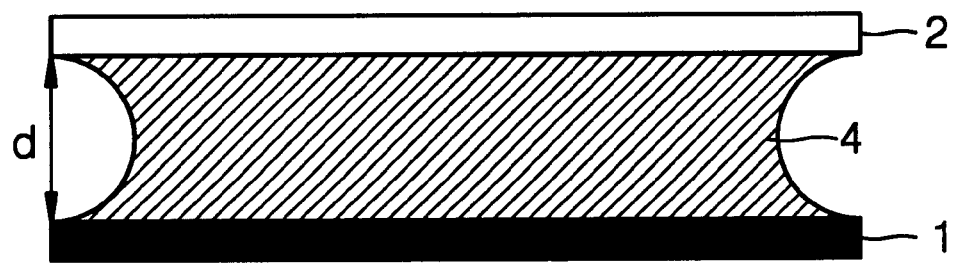
FIGS. 4A and 4B are cross-sectional views illustrating the capillary attraction of a rinsing solution used to remove a sacrificial layer and adhesion of a switching structure to a substrate after drying, respectively, in the manufacture of a conventional vertical actuated MEMS switch.
Figure 4B:
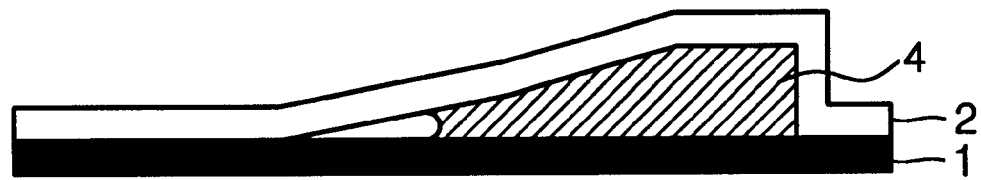
Figure 5:
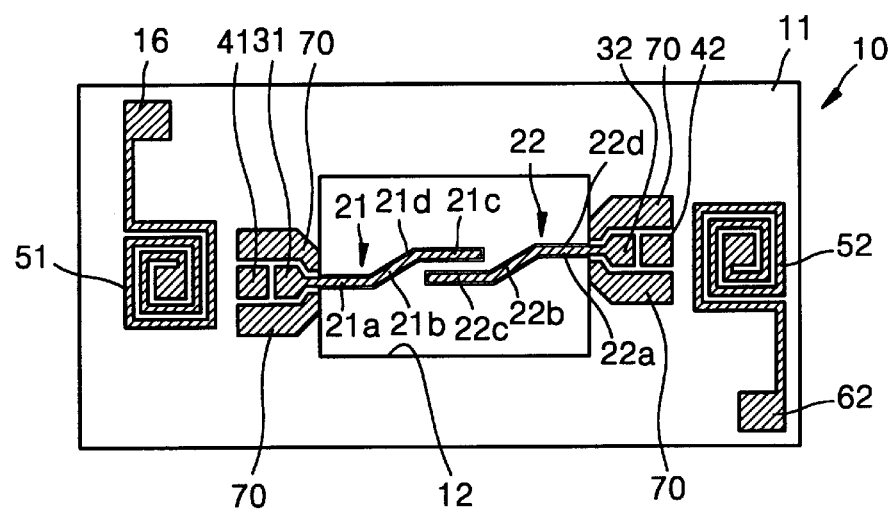
FIG. 5 is a schematic plan view of an electrostatically-actuated capacitive MEMS switch having a single pole single throw (SPST) structure, according to the present invention.
Figure 6:
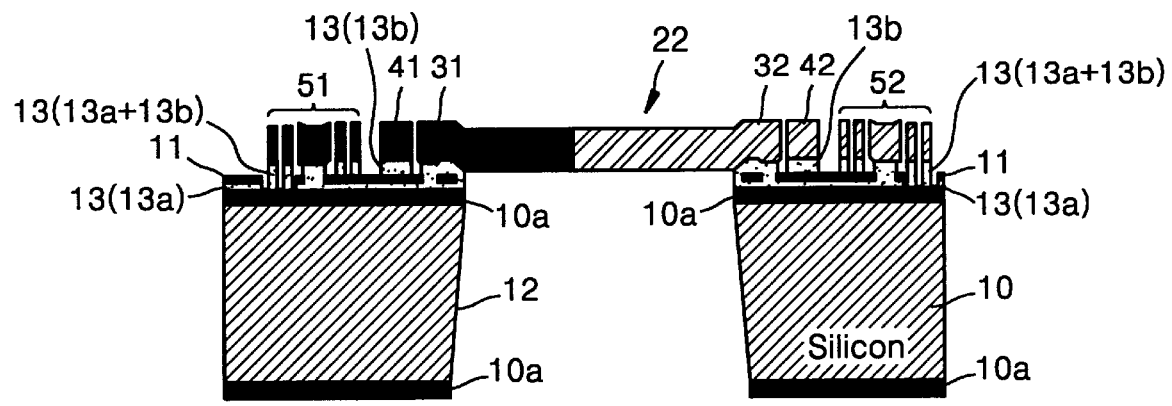
FIG. 6 is a schematic cross-sectional view of the electrostatically-actuated capacitive MEMS switch having an SPST structure shown in FIG. 5.
Figure 7:
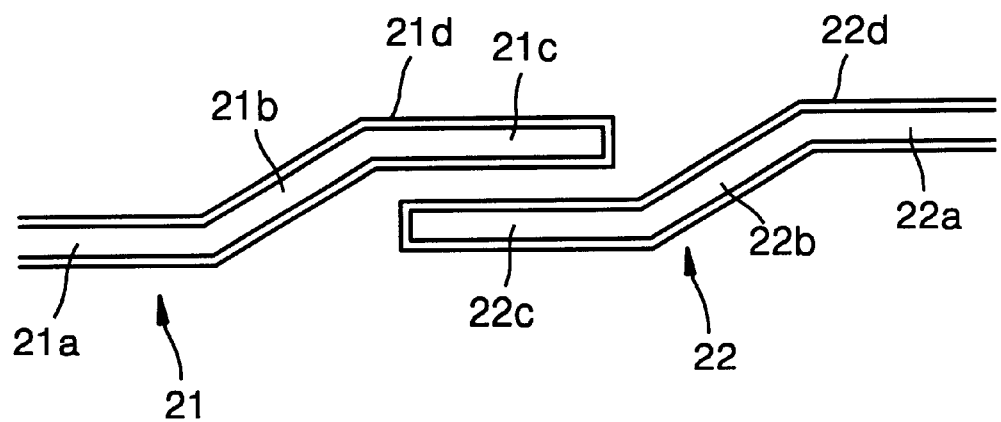
FIG. 7 is a magnified view of a cantilever spring adopted by an electrostatically-actuated capacitive MEMS switch having an SPST structure according to the present invention.

FIG. 5 is a schematic plan view of a switch according to the present invention having an SPST structure. FIG. 6 is a vertically cross-sectional view of the switch. FIG. 7 is a magnified view of the springs 21 and 22 of FIG. 5.

Referring to FIGS. 5 and 6, a rectangular opening 12 is formed at the center of an Si substrate 10. An SiO$_2$ insulating layer 11 is formed on the surface of the substrate 10.

First and second posts 31 and 32 are formed to a predetermined height on both sides of the opening 12. The rear end of a first spring 21 and that of a second spring 22 are connected to the first and second posts 31 and 32, respectively. As shown in FIGS. 5 and 7, the first and second springs 21 and 22 are Z-shaped or shaped of a step, having both lateral portions 21a & 21c and 22a & 22c, respectively, spaced a predetermined distance apart from each other on different planes and slant middle portions 21b and 22b, respectively.

The leading ends 21c and 22c of the first and second springs 21 and 22, respectively, face each other with a predetermined gap. Insulating layers 21d and 22d are formed on the surfaces of the first and second springs 21 and 22, respectively. The insulating layers 21d and 22d prevent direct contact of the first and second springs 21 and 22 and provide a variable capacitance to between the two springs, so that capacitive switching depending on a variation in the capacitance is accomplished by the first and second springs 21 and 22.

As shown in FIG. 5, a signal input port 41 and a signal output port 42 are installed adjacent to the first and second posts 31 and 32, respectively. First and second inductors 51 and 52 are installed outside the signal input port 41 and the signal output port 42, respectively. The first and second inductors 51 and 52 are connected to DC driving voltage input pads 61 and 62, respectively, which are first and second power supply input units provided at two diagonally-opposite corners of the substrate 10.

In this structure, the first and second posts 31 and 32, the first and second springs 21 and 22 connected to them, the first and second inductors 51 and 52, and the DC driving voltage input pads 61 and 62 connected to the first and second inductors are made of the same metal material, for example, copper (Cu), and connected to a metal layer 13 deposited below them. The metal layer 13 is made up of a lower metal layer 13a formed on the bottom surface of the insulating layer 11 and an upper metal layer 13b formed on the upper surface of the insulating layer 11. The insulating layer 11, which is partially formed between the lower and upper metal layers 13a and 13b on the substrate 10, serves as a DC blocking capacitor or a simple electrical insulating layer.

The first and second inductors 51 and 52 shaped of an annual ring serve as a filter for filtering RF signals having a predetermined frequency, and the centers thereof are directly connected to the first and second posts 31 and 32, respectively, via the lower metal layer 13a. In FIG. 5, a ground plane 70 for providing the waveguide of an RF signal together with the first and second posts 31 and 32 and the input and output posts 41 and 42 is installed on either side of the first and second posts 31 and 32 and the input and output ports 41 and 42.

Figure 8:
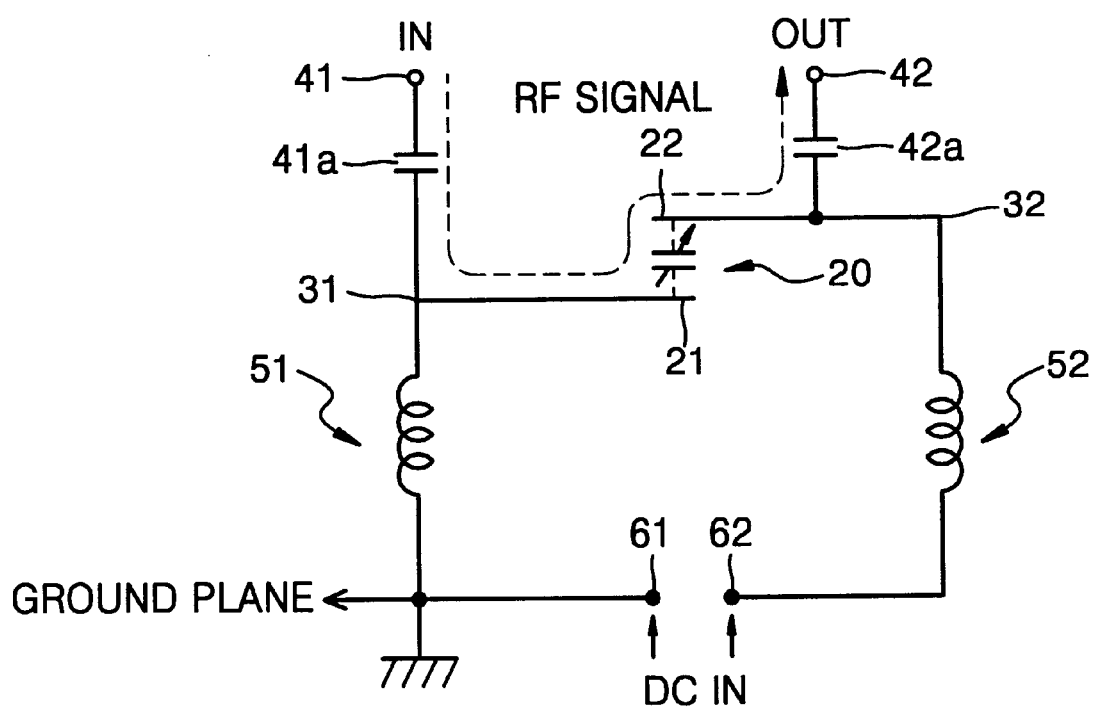
FIG. 8 is an equivalent circuit diagram of the electrostatically-actuated capacitive MEMS switch having an SPST structure shown in FIG. 5.

The equivalent circuit of the switch according to the present invention having such a structure is shown in FIG. 8. Referring to FIG. 8, a capacitive switching element 20, which is formed by the first and second springs 21 an 22 and the insulating layers 21d and 22d respectively formed on the first and second springs, has one end to which an input capacitor 41a and the first inductor 51 are connected, and the other end to which an output capacitor 42a and the second inductor 52 are connected. The input capacitor 41a is connected to the signal input port 41, and the output capacitor 42a is connected to the signal output port 42. Both ends of the capacitive switching element 20, that is, the first and second inductors 51 and 52 respectively connected to the first and second springs 21 and 22, are connected to the DC driving voltage input ports 61 and 62, respectively.

In this structure, the input and output capacitors 41a and 42a block DC applied via the DC driving voltage input ports 61 and 62, and the first and second inductors 51 and 52 block RF signals applied via the signal input port 41 and the signal output port 42. Accordingly, the first and second inductors 51 and 52 must have a predetermined amount of inductance to serve as filters for filtering RF signals with a predetermined frequency received via the signal input port 41.

Figure 9A:
FIGS. 9A through 19B are views illustrating a process for manufacturing the electrostatically-actuated capacitive MEMS switch having an SPST structure shown in FIG. 5.
Figure 9B:
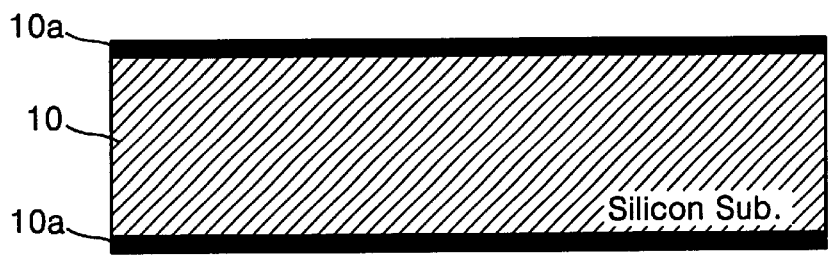

The process for manufacturing the above-described electrostatically actuated capacitive switch according to the present invention having an SPST structure will now be described with reference to FIGS. 9A through 19B. First, as shown in FIGS. 9A and 9B, a wet thermal oxide film 10a having a thickness of about 1.55 $\mu$m is grown by thermally treating a 500±25 $\mu$m-thick p-type <100> silicon substrate 10, both sides of which are polished, at 1,100° C. for 6 hours in a furnace.

Figure 10A:
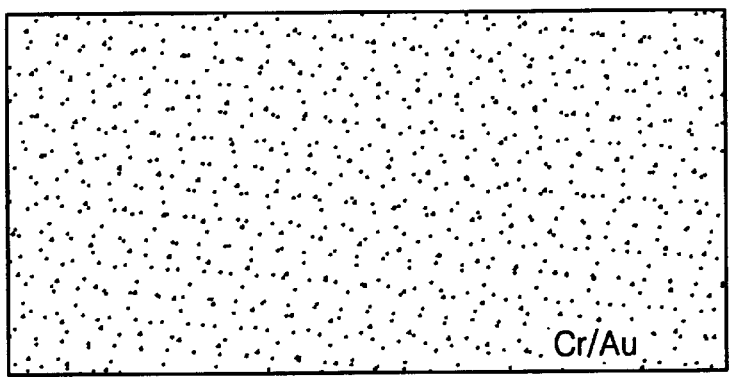
Figure 10B:
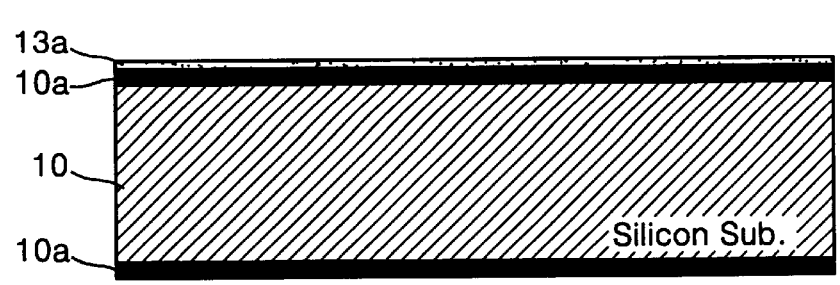

As shown in FIGS. 10A and 10B, Cr is deposited on the grown thermal oxide film 10a to a thickness of about 300 Å using a thermal evaporator, and then Au is deposited on the resultant structure to a 1000 Å thickness. During the deposition, the temperature of the substrate is kept 350° C. to improve the adhesion between the substrate 10 and Cr and Au. Here, a thermally-deposited Cr/Au layer 13a is adopted as the bottom electrode of the DC blocking capacitors 41a and 42a.

Figure 11A:
Figure 11B:
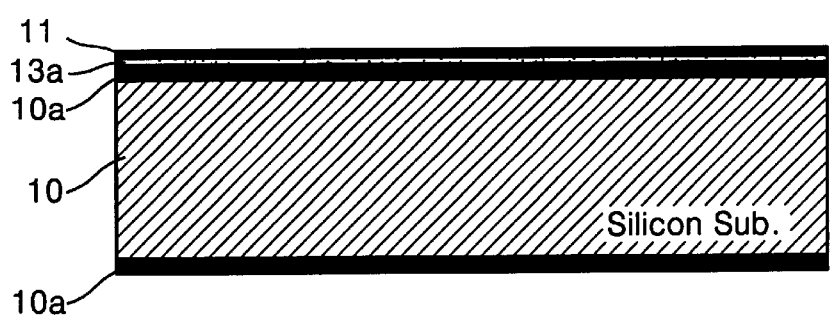

As shown in FIGS. 11A and 11B, an $SiO_2$ insulating layer 11 is deposited on the Cr/Au layer 13a to a 1000 Å thickness by plasma enhanced chemical vapor deposition (PECVD) to form the dielectric layers of the DC blocking capacitors 41a and 42a. During the PECVD process, the temperature of a chamber is kept 300° C.

Figure 12A:
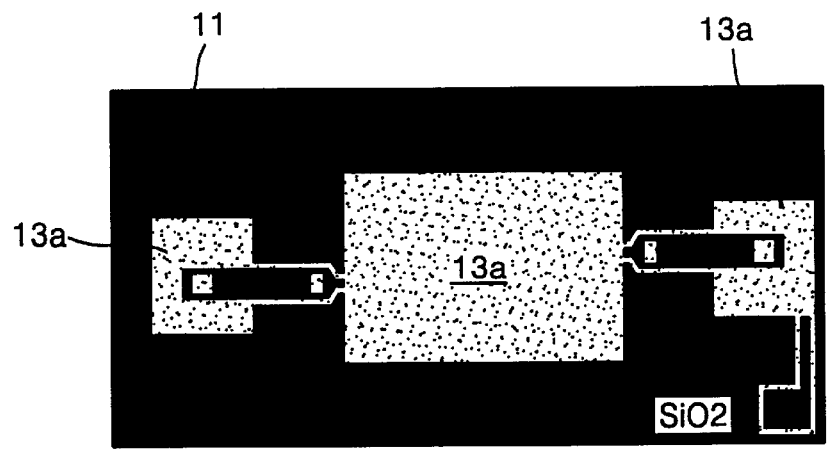
Figure 12B:
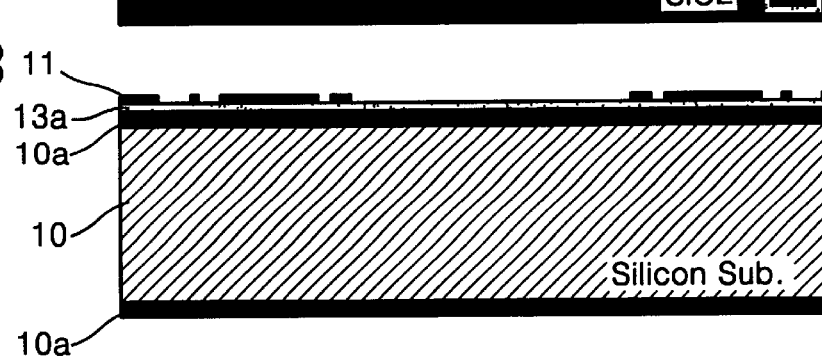

As shown in FIGS. 12A and 12B, the $SiO_2$ insulating layer 11 is patterned by a photolithographic technique adopting a first mask, to form a predetermined pattern. When the $SiO_2$ insulating layer 11 is patterned, a second mask used is made of AZ1513, and the exposure time is 8.5 seconds. $SiO_2$ patterning (etching) using a mask layer is performed for 20 seconds in a buffered oxide etch (BOE) solution.

Figure 13A:
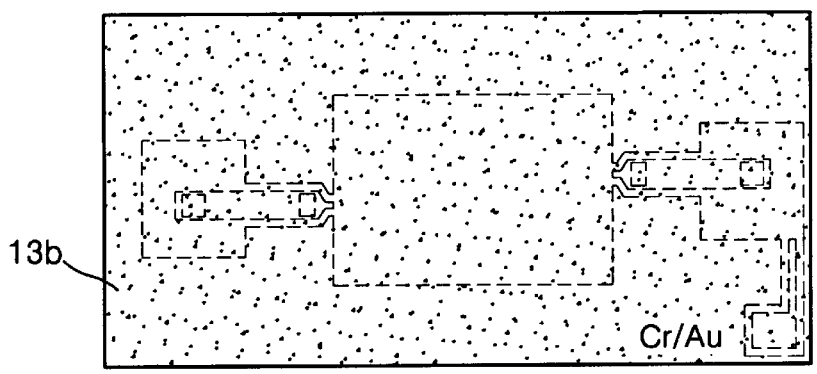
Figure 13B:
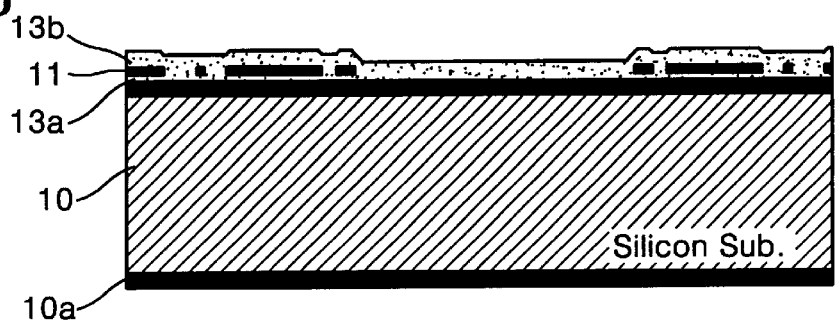

As shown in FIGS. 13A and 13B, a Cr/Au upper metal layer 13b is formed by depositing Cr to a 500 Å thickness and Au to a 2000 Å thickness using a thermal evaporator. At this time, the temperature of the substrate is kept at 150° C. to avoid hillrock caused by the thermal stress of the Cr/Au lower metal layer 13a and the $SiO_2$ insulating layer 11. Here, the Cr/Au upper metal layer 13b serves as a germinative layer for electrolytic plating.

Figure 14A:
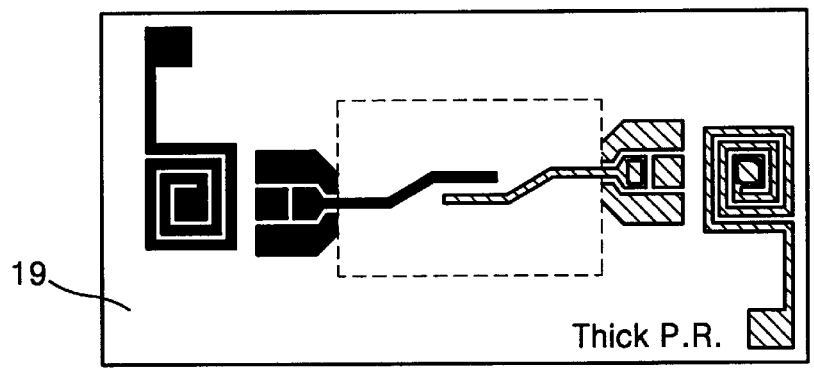
Figure 14B:
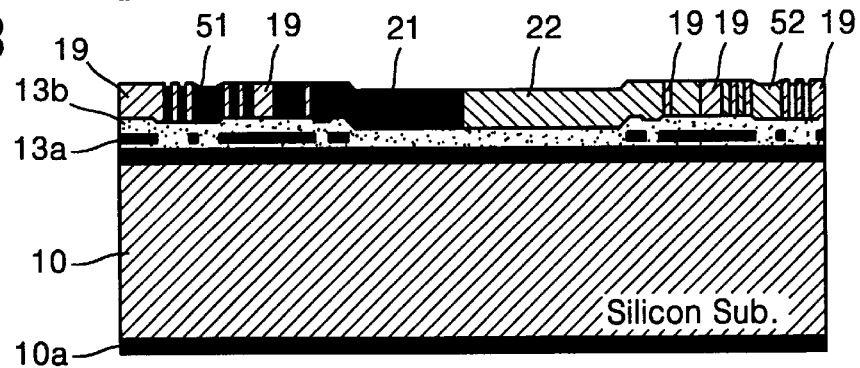

As shown in FIGS. 14A and 14B, a second mask, which serves as a plating mold, is formed on the Cr/Au upper metal layer 13b by a photolithographic method using an AZ9260 photoresistor, and then undergoes an electrolytic plating process. Here, the second mask, which serves as a plating mold, has a pattern that corresponds to the pattern formed by the first and second posts 31 and 32, the first and second springs 21 and 22, the first and second inductors 51 and 52, and the DC driving voltage input pads 61 and 62.

In the electrolytic plating process, after a plating solution pours into an electrolytic plating tub, a metal plate made of a metal to be plated, for example, a Cr plate, is connected to an anode, the silicon substrate 10 on which the second mask is formed is connected to a cathode, and then 10–20 mA/cm² current is flowed into the electrolytic plating tub. In this plating process, copper and nickel are plated. The composition of a plating solution used in this plating process is shown in Table 1.

TABLE 1

| Nickel | | Copper | |
|---|---|---|---|
| Compound | Quantity (g/l) | Compound | Quantity |
| NiSO$_4$—6H$_2$O | 200 | | |
| NiCl$_2$—6H$_2$O | 5 | CuSO$_4$, 5H$_2$O | 1200 (g/l) |
| H$_3$BO$_3$ | 25 | H$_2$SO$_4$ | 100 (ml/l) |
| Saccharin | 3–5 | | |

The first and second posts 31 and 32, the first and second springs 21 and 22, the first and second inductors 51 and 52 and the DC driving voltage input pads 61 and 62 are formed on an exposed portion of a mask to a predetermined thickness by the above-described plating. After the plating, the mask is removed by acetone, and cleaning can be performed if necessary. Here, the cleaning is performed for about 5 minutes using a solution in which H$_2$SO$_4$ and H$_2$O$_2$ are mixed at a ratio of 2 to 1.

Figure 15A:
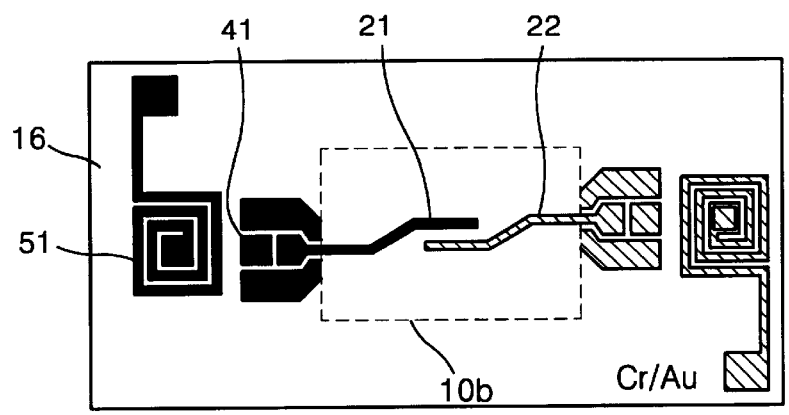

Referring to FIG. 15A, after the second mask is removed, the resultant structure is coated with a protective layer 16 for protecting the resultant structure. The protective layer 16 prevents the resultant structure from being damaged by an etch solution during a subsequent process of etching the substrate 10. Here, the protective layer 16 is formed by the sublimation of ethylene diamine pyrocathecol (EDP). Parylene has strong resistance to the temperature, the humid and chemical materials, and is sublimated in a vacuum state, so that it can form a protective layer 16 which is very dense. Thus, the use of parylene to form a protective layer enables complete protection in which up to portions that are not coated by liquid coating are protected without generating pinholes and bridges.

Figure 15B:
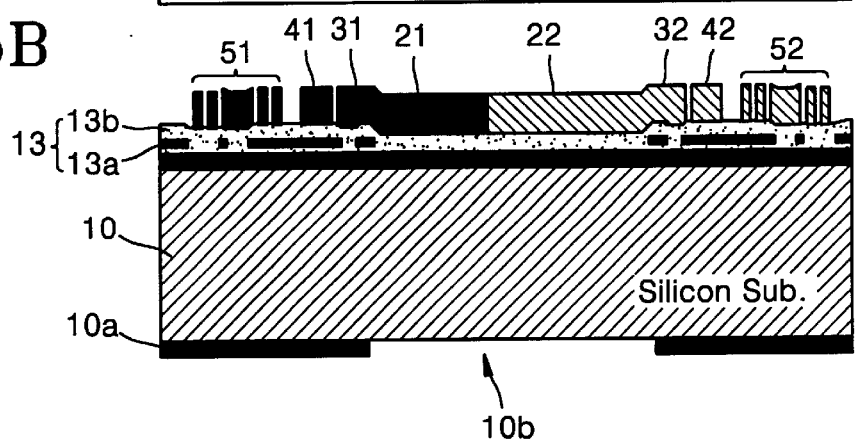

As shown in FIG. 15B, the thermal oxide film 10$a$ formed on the bottom surface of the substrate 10 is patterned by a photolithographic method adopting a third mask. The thermal oxide film is etched in a BOE solution, and the third mask is formed of AZ1513. It takes about 10 minutes to etch the thermal oxide film 10$a$ having a 1.55 $\mu$m thickness using the BOE solution, so that the etch rate of the thermal oxide film is 1.500 Å/min.

An exposed portion 10$b$ of the bottom surface of the substrate 10 obtained by etching the thermal oxide film 10$a$ exists under the first and second springs 21 and 22.

Figure 16A:
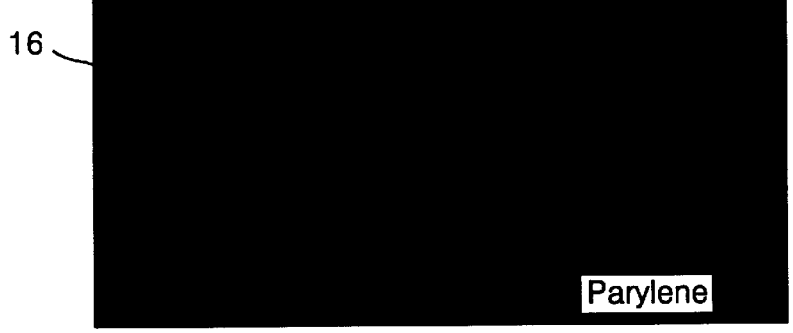
Figure 16B:
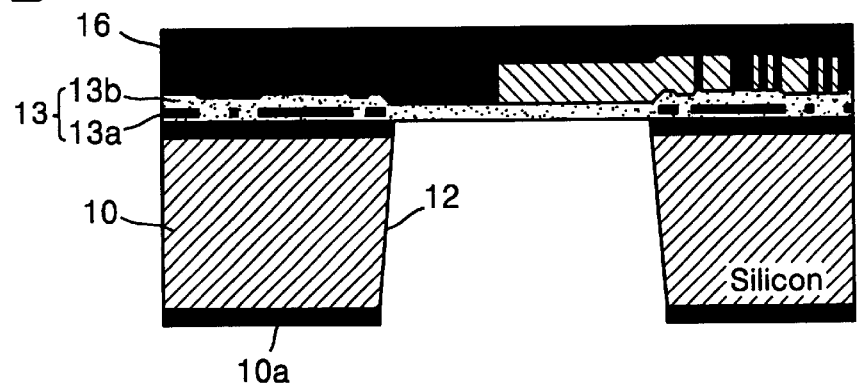

As shown in FIGS. 16A and 16B, an opening 12 is formed by removing the exposed portion of the bottom surface of the substrate 1, so that the bottom surface of the lower metal layer 13$a$ formed on the upper surface of the substrate 10 is exposed. At this time, the thermal oxide film 10$a$ on the bottom surface of the etched substrate 10 is used as a silicon etch mask, and EDP is used as an etch solution. Also, the temperature of the etch solution is kept at 115° C., and the silicon etch rate is about 1.2 $\mu$m/min. It takes about 8 hours to etch 500±25 $\mu$m silicon. After the substrate 10 is completely etched, the parylene protective layer 16 for protecting a structure is removed by reactive ion etching (RIE).

Figure 17A:
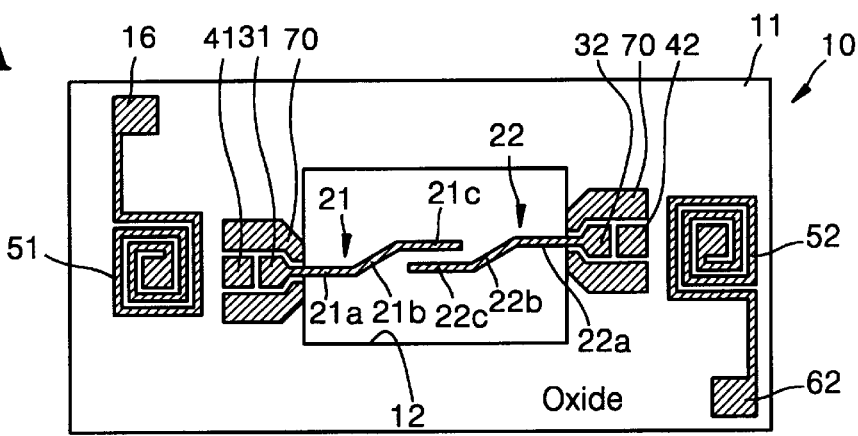
Figure 17B:
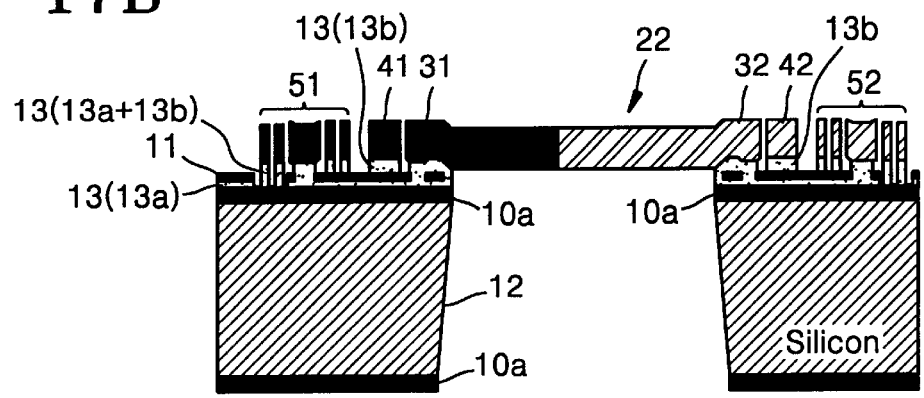

As shown in FIGS. 17A and 17B, the lower metal layer 13$a$ on the bottom of the opening 12 is removed to separate the first and second springs 21 and 22 from the upper surface of the substrate 10.

Figure 18A:
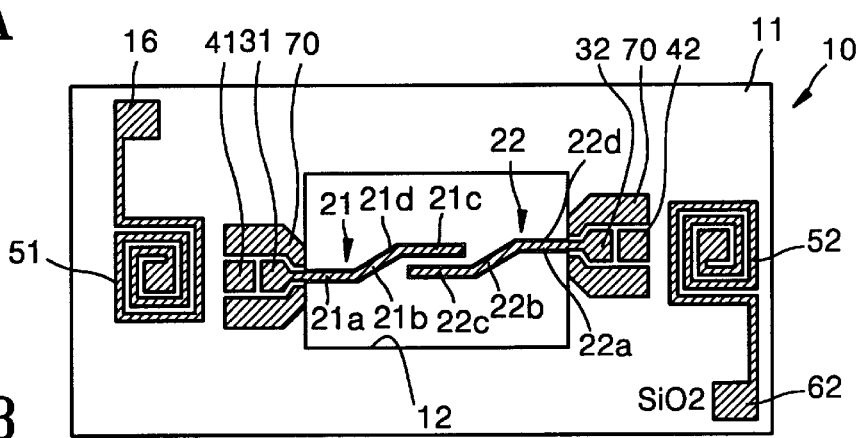
Figure 18B:
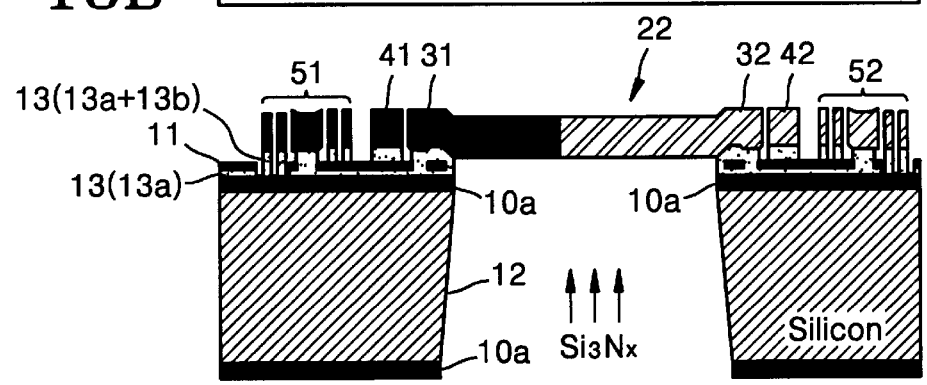

As shown in FIGS. 18A and 18B, insulating layers 21$d$ and 22$d$ are formed on the surfaces of the first and second springs 21 and 22 by depositing silicon nitride (Si$_3$N$_x$) introduced from the bottom surface of the substrate 10 via the opening 12.

Figure 19A:
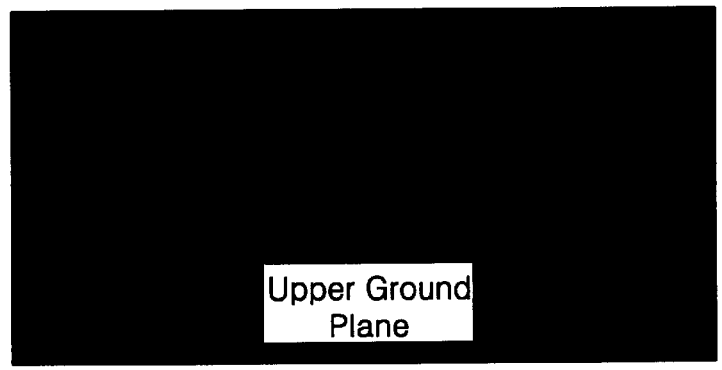
Figure 19B:
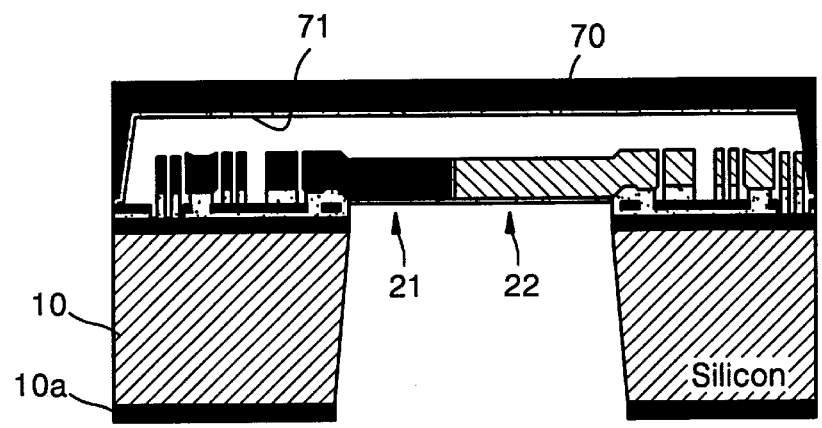

As shown in FIGS. 19A and 19B, a cover 70 having a conductive ground plane 71 formed in its inner surface is provided to thus obtain a desired electrostatically actuated capacitive switch having an SPST structure. The cover 70 has a channel formed to embrace the structure formed on the substrate 10. Also, on the inner surface of the cover 70 is formed the ground plane 71 for providing an RF waveguide together with the structure, in particular, with the first and second springs 21 and 22.

Figure 20:
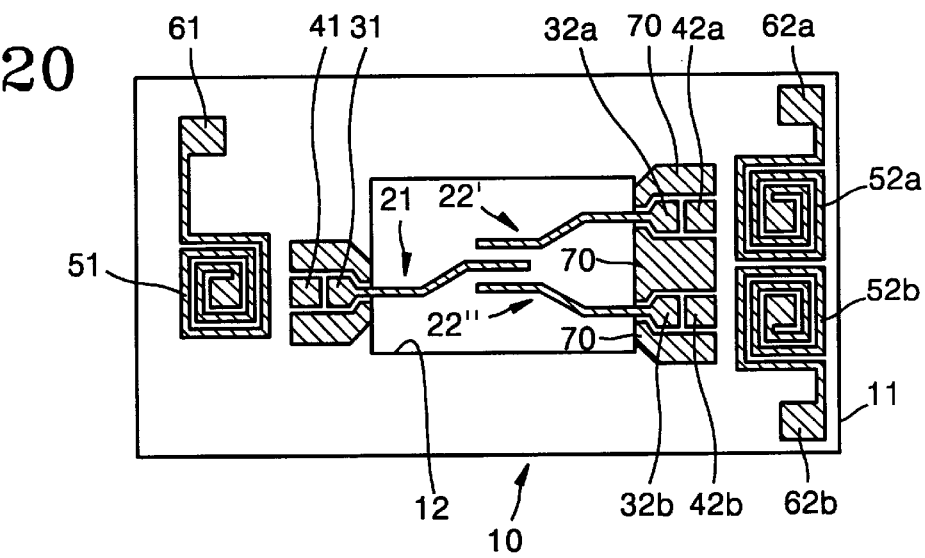
FIG. 20 is a schematic plan view of an electrostatically-actuated capacitive MEMS switch having a single pole double throw (SPDT) structure, according to the present invention.

FIG. 20 is a schematic plan view of an electrostatically actuated capacitive switch having an SPDT structure. FIG. 20 shows only the upper surface structure of the switch. The remaining portions of the switch can be inferred from the stacked structure of the above-described switch having an SPST structure.

Referring to FIG. 20, a rectangular opening 12 is formed at the center of an Si substrate 10. An SiO$_2$ insulating layer 11 is formed on the surface of the substrate 10.

A first cantilever spring 21, a second spring 22' and a third spring 22" are located over the opening 12. The first spring 21 is connected to a first post 31 formed at one side of the opening 12, and the second and third springs 22' and 22" are connected to second and third posts 42$a$ and 42$b$, respectively, installed a predetermined distance apart at the other side of the opening 12.

The second and third springs 22' and 22" are isolated predetermined distances from both sides of the leading end of the first spring 21, respectively. Signal input and output ports 41, 42$a$ and 42$b$ are installed adjacent to the posts 31, 32$a$ and 32$b$, respectively, to be capacitive-combined with the posts 31, 32$a$ and 32$b$ by the insulating layer under the posts. Also, first, second and third inductors 51, 52$a$ and 52$b$ which are electrically connected to the posts 31, 32$a$ and 32$b$, respectively, by metal layers under the posts are installed outside the posts 41, 42$a$ and 42$b$, respectively.

The inductors 51, 52$a$ and 52$b$ are connected to DC driving voltage input pads 61, 62$a$ and 62$b$, respectively, which are respectively a first power supply input unit and second and third selective power supply input units.

Similar to the structure of the springs of the above-described switch having an SPST structure, the springs 21, 22' and 22" are Z-shaped or stepped having both lateral portions isolated a predetermined distance apart from each other on different planes and a slanted middle portion for connecting the lateral portions to each other.

An insulating layer is formed on the surface of each of the springs 21, 22' and 22", and prevents direct contact between the springs and provides a variable capacitance to between the springs, resulting in capacitive switching depending on the variation in capacitance.

Figure 21:
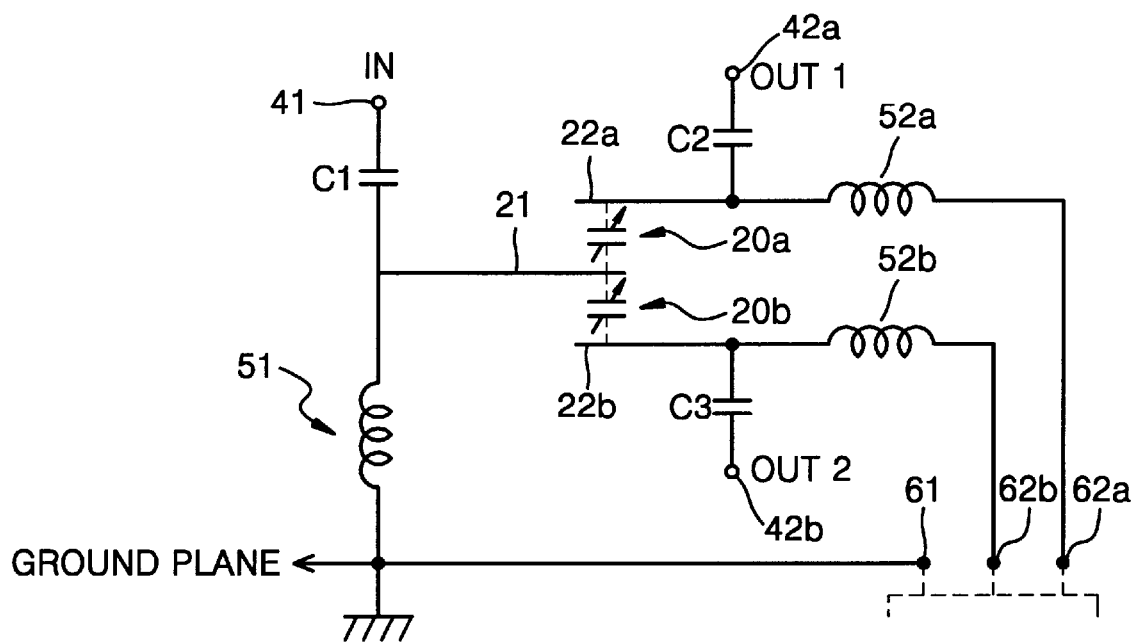
FIG. 21 is an equivalent circuit diagram of the electrostatically-actuated capacitive MEMS switch having an SPDT structure shown in FIG. 20.

The electrical connection structure of the elements adopts that of the above-described switch having an SPST structure, and its equivalent circuit is shown in FIG. 21.

Referring to FIG. 21, capacitive selective switching elements 20$a$ and 20$b$ are formed by the first, second and third springs 21, 22$a$ and 22$b$ each having an insulating layer formed thereon. A common contact portion of the first and second switching elements 20$a$ and 20$b$ is connected to an input capacitor C1 and the first inductor 51. The other end of the first switching element 20$a$ is connected to an output capacitor C2 and the second inductor 52$a$, and the other end of the second switching element 20$b$ is connected to an output capacitor C3 and the third inductor 52$b$. The input capacitor C1 is connected to a signal input port 41, the first output capacitor C2 is connected to the first signal output port 42$a$, and the second output capacitor C3 is connected to the second signal output port 42b. The inductors 51, 52a and 52b are connected to the driving voltage input ports 61, 62a and 62b, respectively.

In this structure, the capacitors C1, C2 and C3 block direct current (DC) applied via the DC driving voltage input ports 61, 62a and 62b, and the inductors 51, 52a and 52b block RF signals applied via the signal input port 41 and the signal output ports 42a and 42b. Accordingly, the inductors 51, 52a and 52b must have a predetermined amount of inductance to serve as filters for filtering RF signals with a predetermined frequency received via the signal input port 41.

Similar to the previous embodiment, the capacitors C1, C2 and C3 in this embodiment are provided by the insulating layer formed on the substrate 10 and the metal layers on the upper and lower surfaces of the insulating layer.

The above-described switches according to the present invention has a feature in that their actuation and switching are accomplished by cantilever springs, and the springs move parallel to the plane of a substrate. Accordingly, the entire structures of the switches can be greatly simplified, and switching can be very stably accomplished. Another feature of these switches is that the switches have Z-shaped springs as described above. According to the structural feature of these springs, stable switching occurs, and, in particular, switching is achieved by two springs, whereby the amount of operating voltage required for switching can be lowered.

Also, formation of an opening under the springs can prevent adhesion between a substrate and springs that can be caused during the manufacture of a switch, and, in particular, minimize the dielectric loss between the springs and the substrate.

Due to decreases in the adhesion probability of a microwave MEMS switch that is a core component of a microwave MEMS (or RF MEMS) that becomes rapidly important in recent years, a switch according to the present invention has a structure capable of solving the high power transmission problem caused with a decrease in the thickness of the switch.

The microwave MEMS switch according to the present invention significantly solve an increase in dielectric loss caused with an increase in the frequency of a compound semiconductor such as silicon and GaAs in existing semiconductor switches, so that it has a very low loss. Also, the components of this microwave MEMS switch that are required by IMT2000 and recent communications systems are small and lightweight, and a power loss is reduced. According to an ANSYS simulation and analysis, a 3 mm-long switch according to the present invention had a 30V driving voltage for raising pull-in. According to the simulation using a parallel plate capacitor and a spring model, the driving voltage for rasing pull-in was 28.89V. According to the simulation performed in a high frequency region using HPEESOF, the insertion loss in a 2 GHz band was −2.1 db. The above analysis and simulations show that a model proposed by the present invention and a structure in which a portion of a substrate under a switch has been etched are useful since they overcome the limits of existing MEMS switches in terms of the mechanical actuation, the microwave characteristics and the durability.

What is claimed is:

1. An electrostatically actuated capacitive MEMS switch comprising:
    a substrate;
    first and second posts installed a predetermined distance apart on the substrate;
    a first cantilever spring having a rear portion connected to the first post and a leading portion located at the center of the substrate; and
    a second cantilever spring having a rear portion connected to the second post and a leading portion spaced a predetermined distance apart from the leading portion of the first spring,
    wherein an insulating layer is formed on the leading portion of at least one of the first and second springs to form a variable capacitor between the leading portion of the first spring and that of the second spring.

2. The electrostatically actuated capacitive MEMS switch of claim 1, wherein a signal input unit and a signal output portion are installed adjacent to the first and second posts, respectively, to be electrically connected to the first and second posts, respectively, and a signal input capacitor and a signal output capacitor are installed between the signal input unit and the first post and between the signal output unit and the second post, respectively, to block the flow of direct current.

3. The electrostatically actuated capacitive MEMS switch of claim 1, wherein first and second power supply input units are installed adjacent to the first and second posts, respectively, to be electrically connected to the first and second posts, respectively, and first and second inductors with predetermined inductance for blocking electrical signals with a predetermined frequency and greater are installed between the first post and the first power supply input unit and between the second post and the second power supply input unit, respectively.

4. The electrostatically actuated capacitive MEMS switch of claim 2, wherein first and second power supply input units are installed adjacent to the first and second posts, respectively, to be electrically connected to the first and second posts, respectively, and first and second inductors with predetermined inductance for blocking electrical signals with a predetermined frequency and greater are installed between the first post and the first power supply input unit and between the second post and the second power supply input unit, respectively.

5. The electrostatically actuated capacitive MEMS switch of claim 1, wherein the springs are Z-shaped and stepped, each having both lateral portions located on different planes and a slanted middle portion for connecting the two lateral portions.

6. The electrostatically actuated capacitive MEMS switch of claim 2, wherein the springs are Z-shaped and stepped, each having both lateral portions located on different planes and a slanted middle portion for connecting the two lateral portions.

7. The electrostatically actuated capacitive MEMS switch of claim 3, wherein the springs are Z-shaped and stepped, each having both lateral portions located on different planes and a slanted middle portion for connecting the two lateral portions.

8. The electrostatically actuated capacitive MEMS switch of claim 4, wherein the springs are Z-shaped and stepped, each having both lateral portions located on different planes and a slanted middle portion for connecting the two lateral portions.

9. The electrostatically actuated capacitive MEMS switch of claim 1, wherein an opening is formed at the center of the substrate, and the springs are located over the opening.

10. The electrostatically actuated capacitive MEMS switch of claim 2, wherein an opening is formed at the center of the substrate, and the springs are located over the opening.

11. The electrostatically actuated capacitive MEMS switch of claim 3, wherein an opening is formed at the center of the substrate, and the springs are located over the opening.

12. The electrostatically actuated capacitive MEMS switch of claim 4, wherein an opening is formed at the center of the substrate, and the springs are located over the opening.

13. The electrostatically actuated capacitive MEMS switch of claim 5, wherein an opening is formed at the center of the substrate, and the springs are located over the opening.

14. The electrostatically actuated capacitive MEMS switch of claim 6, wherein an opening is formed at the center of the substrate, and the springs are located over the opening.

15. The electrostatically actuated capacitive MEMS switch of claim 7, wherein an opening is formed at the center of the substrate, and the springs are located over the opening.

16. The electrostatically actuated capacitive MEMS switch of claim 8, wherein an opening is formed at the center of the substrate, and the springs are located over the opening.

17. An electrostatically actuated capacitive MEMS switch comprising:
a substrate;
a first post installed at one side on the substrate;
second and third posts installed a predetermined distance apart at the other side on the substrate;
a first cantilever spring having a rear portion connected to the first post and a leading portion extending toward the center of the substrate;
a second cantilever spring having a rear portion connected to the second post and a leading portion spaced a predetermined distance apart from one side of the leading portion of the first spring; and
a third cantilever spring having a rear portion connected to the third post and a leading portion spaced a predetermined distance apart from the other side of the leading portion of the first spring,
wherein an insulating layer is formed on at least one side of both sides of the leading portion of the first spring, the inner side of the second spring facing on side of the leading portion of the first spring, and the inner side of the third spring facing on the other side of the leading portion of the first spring, so that a variable capacitor is formed between the leading portions of adjacent springs.

18. The electrostatically actuated capacitive MEMS switch of claim 17, wherein a signal input unit is installed adjacent to the first post to be electrically connected to the first post, a signal input capacitor is installed between the signal input unit and the first post to block the flow of direct current, first and second selective signal output units are installed adjacent to the second and third posts to be electrically connected to the second and third posts, respectively, and first and second output capacitors are installed between the second post and the first selective signal output unit and between the third post and the second selective signal output unit, respectively, to block the flow of direct current.

19. The electrostatically actuated capacitive MEMS switch of claim 17, wherein a first power supply input unit is installed adjacent to the first post to be electrically connected to the first post, a first inductor for blocking electrical signals with a predetermined frequency and greater by having predetermined inductance is installed between the first post and the first power supply input unit, second and third selective power supply input units are installed adjacent to the second and third posts, respectively, and second and third inductors for blocking electrical signals with a predetermined frequency and greater by having predetermined inductance are installed between the second post and the first selective power supply input unit and between the third post and the second selective power supply input unit, respectively.

20. The electrostatically actuated capacitive MEMS switch of claim 17, wherein a first power supply input unit is installed adjacent to the first post to be electrically connected to the first post, a first inductor for blocking electrical signals with a predetermined frequency and greater by having predetermined inductance is installed between the first post and the first power supply input unit, second and third selective power supply input units are installed adjacent to the second and third posts, respectively, and second and third inductors for blocking electrical signals with a predetermined frequency and greater by having predetermined inductance are installed between the second post and the first selective power supply input unit and between the third post and the second selective power supply input unit, respectively.

21. The electrostatically actuated capacitive MEMS switch of claim 17, wherein the springs are Z-shaped and stepped, each having both lateral portions located on different planes and a slanted middle portion for connecting the two lateral portions.

22. The electrostatically actuated capacitive MEMS switch of claim 18, wherein the springs are Z-shaped and stepped, each having both lateral portions located on different planes and a slanted middle portion for connecting the two lateral portions.

23. The electrostatically actuated capacitive MEMS switch of claim 19, wherein the springs are Z-shaped and stepped, each having both lateral portions located on different planes and a slanted middle portion for connecting the two lateral portions.

24. The electrostatically actuated capacitive MEMS switch of claim 20, wherein the springs are Z-shaped and stepped, each having both lateral portions located on different planes and a slanted middle portion for connecting the two lateral portions.

25. The electrostatically actuated capacitive MEMS switch of claim 17, wherein an opening is formed at the center of the substrate, and the springs are located over the opening.

26. The electrostatically actuated capacitive MEMS switch of claim 18, wherein an opening is formed at the center of the substrate, and the springs are located over the opening.

27. The electrostatically actuated capacitive MEMS switch of claim 19, wherein an opening is formed at the center of the substrate, and the springs are located over the opening.

28. The electrostatically actuated capacitive MEMS switch of claim 20, wherein an opening is formed at the center of the substrate, and the springs are located over the opening.

29. The electrostatically actuated capacitive MEMS switch of claim 21, wherein an opening is formed at the center of the substrate, and the springs are located over the opening.

30. The electrostatically actuated capacitive MEMS switch of claim 22, wherein an opening is formed at the center of the substrate, and the springs are located over the opening.

31. The electrostatically actuated capacitive MEMS switch of claim 23, wherein an opening is formed at the center of the substrate, and the springs are located over the opening.

32. The electrostatically actuated capacitive MEMS switch of claim 24, wherein an opening is formed at the center of the substrate, and the springs are located over the opening.

* * * * *